UNITED STATES PATENT OFFICE.

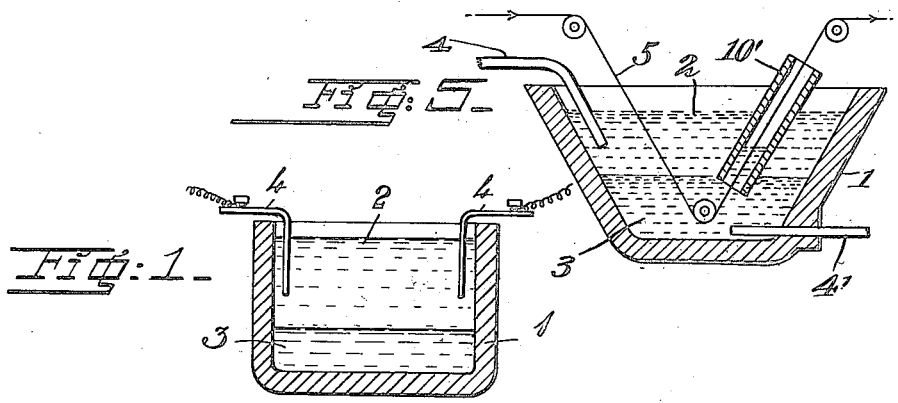
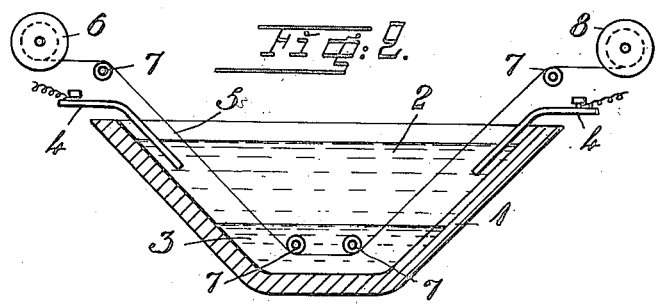
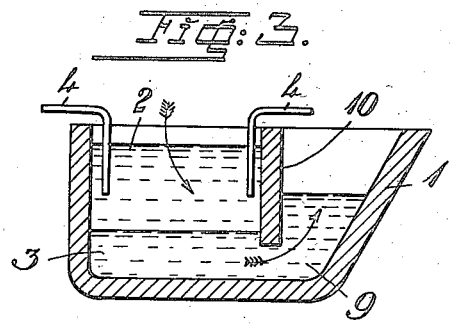
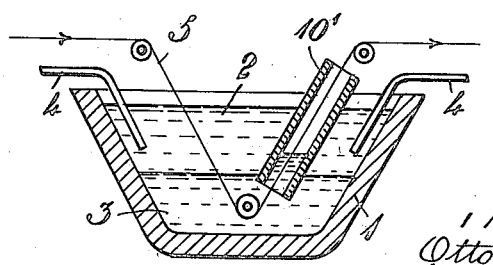

OTTO STÅLHANE AND OLOF OSKAR KRING, OF DJURSHOLM, SWEDEN.

PROCESS FOR COATING METAL OBJECTS WITH A LAYER OF ANOTHER METAL.

1,426,683.	Specification of Letters Patent.	Patented Aug. 22, 1922.

Application filed April 29, 1920. Serial No. 377,714.

*To all whom it may concern:*

Be it known that we, OTTO STÅLHANE and OLOF OSKAR KRING, engineers, subjects of the King of Sweden, residing in Djursholm, in the Kingdom of Sweden, have invented certain new and useful Improvements in Processes for Coating Metal Objects with a Layer of Another Metal, of which the following is a specification.

The present invention relates to a process and device for coating objects of metal with a layer of another metal, i. e. for zincing, coppering, tinning, etc.

In accordance with the present invention the said process is performed in the following manner: a bath consisting partly of the metal or metal alloy with which the objects are to be coated, and partly of a suitable flux, for example boron compounds, metal chlorides, metal fluorides, or the like, is kept in a molten condition by transmitting an alternating electric current through the flux; the objects to be coated are first dipped in the flux, which owing to its lower specific weight floats on the metal bath, and afterwards, when they have been sufficiently heated and purified, are plunged further down into the metal bath under the supernatant flux, where they are coated with a strongly adhesive layer of the metal or metal alloy of which the bath is composed. In this process a larger or smaller part of the alternating electric current passing through the flux will also pass through the metal bath, in which it sets up currents which assist the uniform heating of the metal bath.

This method is not merely suitable for the treatment of single objects of metal, but can also be used with advantage in the continuous treatment of material in lengths, such as wire, metal ribbon, etc., the material to be coated being continuously led both through the flux bath and through the metal bath.

In order to make plain the invention there are shown on the accompanying drawings, in outline, by way of example, some forms of devices suitable for performing it. Fig. 1 shows in vertical section a device for the treatment of single objects. Fig. 2 shows in vertical section a device for the continuous treatment of wire, ribbon, and the like.

Fig. 3 shows another form of an apparatus corresponding to that illustrated in Fig. 1, but provided with arrangements whereby the object can be removed from the metal bath without having to come into contact with the flux. Fig. 4 shows a form of an apparatus in accordance with Fig. 2 modified for the same purpose. Fig. 5 shows in the same manner an apparatus in which the current is led both through the flux and through the metal bath. In the different figures corresponding parts are provided with the same designations. The invention is first described with reference to Figs. 1 and 2.

In Fig. 1, 1 designates a crucible of refractory material in which there is a bath 2 of some suitable flux, and beneath the latter a metal bath 3. In the bath 2 there dip two electrodes 4, by means of which an electric current can be passed through the flux. If this current is of sufficient strength, the flux is heated to such an extent that both the latter and the metal bath 3 are kept in a molten-liquid condition. An object dipped in the bath 2 is heated and purified by the latter, so that when it is afterwards plunged down into the metal bath 3, it is coated or covered with a strongly adhesive layer of that metal.

In Fig. 2, 5 designates the wire or ribbon which is to be coated with metal, it is uncoiled from the drum or roller 6 and carried over guiding pins, rods, or rollers 7, so that it will pass down through the flux bath 2 and thence down through the metal bath 3, whereupon, having been coated with metal, it is led out of the bath in a similar manner and wound up on the reel 8 after having (if necessary) passed through some purifying apparatus.

In coating a metal object with a layer of another metal or alloy in accordance with the process above described it is under certain circumstances important to be able to remove the object lowered in the metal bath without its again coming into contact with the flux floating on the metal bath. This object is attained in accordance with the present invention by the following device: in the crucible containing the melting bath is arranged a partition the underedge of which reaches down into the metal bath, leaving one or more openings between the partition and the bottom of the crucible. A partition wall so arranged confines a bath of fluxes floating on the metal bath, on one side of the partition, in such wise that the metal bath on the other side of the partition is not covered by the flux. An object plunged through the flux into the metal bath can then, by being passed under the partition on its other side, where the metal bath is uncovered by the flux, be removed from the metal bath without again coming into contact with the flux.

Figs. 3 and 4 show for the said purpose suitable modified forms of the arrangements illustrated in Figs. 1 or 2.

In Fig. 3, 1 is a crucible of refractory material, provided with a partition 10, which does not reach down to the bottom of the crucible, there being between the latter and the under edge of the partition an opening 9. In the crucible there is a metal bath 3, which reaches up over the lower edge of the partition 10, and on the one side of the partition there is a bath 2 of some suitable flux which is lighter than the metal bath and is prevented by the latter from penetrating through the opening 9 under the partition into the other side of the partition. In the bath 2 there dip two electrodes 4, which supply the current required for heating the bath.

An object of metal which is dipped into the flux and plunged down through the latter into the metal bath and through the opening 2 under the partition up through and out of the metal bath on the other side of the partition, in the direction indicated by the arrows, will thus on being removed from the metal bath not have come into contact with the flux.

According to Fig. 4, which shows a device intended for the treatment of metal ribbons, and similar objects in continuous lengths, the partition which separates part of the metal bath from the flux is arranged in the form of a pipe $10^1$ which reaches down into the metal bath and provides in its interior a metal surface free from the flux. A wire (or ribbon) 5, which is carried over the rollers 7 through the flux 2 down into the metal bath 3 and up through the pipe $10^1$, in the direction indicated by the arrows, will thus, when it is taken out of the metal bath, not have come into contact with the flux. The arrangements shown in Figs. 3 and 4, as compared with those shown in Figs. 1 and 2, have the advantage that the part of the surface of the metal bath which is in contact with the air will be far smaller, whereby oxidation of the metal is practically obviated. The pipe $10^1$ or the partition 10 may be made of refractory material, of metal, or other suitable material.

The arrangements described above are merely to be regarded as illustrative examples, and it is evident that the process can be performed also in other ways and with other devices, while retaining its characteristic features. Thus, for example, the device in question may, as shown in Fig. 5, be provided with one or more electrodes 4 in contact with the flux, and connected to one of the poles of the current generator, while the other pole by means of one or more electrodes $4^1$ which are in contact with the metal bath and which may be inserted through the bottom of the crucible, is connected to the metal bath. In this case the entire current will first pass through the flux and afterwards through the metal bath. It is also possible by arranging a suitable number of electrodes in a suitable manner to connect the device to a polyphase current system.

In certain circumstances it may be advisable before dipping the objects in the flux, to warm them in some suitable manner as well as previously to clean the surfaces which are to be coated with metal.

The present process, in comparison with those hitherto known, has the great advantage that the metal objects during the entire process remain fully protected against contact with air, whence even in very oxidizable metals the expensive and hindersome oxidation of the metals, which is inevitable in other processes, is here entirely obviated. Moreover this process entails the advantage that the metal objects, after the current temperature has been imparted to the bath by regulating the strength of the current, cannot be exposed to the risk of injurious superheating or actual smelting, as is the case when they are heated in other, hitherto employed ways. Further, this extremely simple procedure is attended by the advantage that the work can be performed by non-skilled hands, which is not the case with methods hitherto known.

The word "metal" as used in this specification and in the following claims comprises also alloys of two or several metals.

Having thus described our invention, we declare, that what we claim is:

1. Process for coating objects of metal with a layer of another metal, characterized by the fact that a bath consisting partly of the metal with which the objects are to be coated, and partly of a suitable flux is kept in a molten condition by passing an alternating electric current through the flux, that the objects are first dipped in the flux, and afterwards, when they have been sufficiently heated are plunged down into the metal bath under the flux, and passing said alternating electric current through both the flux and the metal bath.

2. Process for coating lengths of metal as set forth in claim 1, characterized by the fact that the object is continuously led through the flux bath down into the metal bath, and afterwards out of the latter.

3. Process for coating objects of metal with a layer of another metal, which consists in preparing a bath composed partly of the coating metal and partly of a flux, maintaining part of the surface of the bath free from flux, passing an alternating electric current through both the flux and metal bath thereby to maintain the bath in molten condition, and plunging the object to be treated in the metal bath through the flux and removing it from the bath at the free surface thereof.

In witness whereof we have hereunto set our hands in presence of two witnesses.

OTTO STÅLHANE.
OLOF OSKAR KRING.

Witnesses:
 AUG. HAGELIN,
 O. LINDAHL.